(12) United States Patent
Quigley et al.

(10) Patent No.: US 9,400,555 B2
(45) Date of Patent: Jul. 26, 2016

(54) SYSTEM AND METHOD FOR SYNCHRONIZATION OF HAPTIC DATA AND MEDIA DATA

(71) Applicant: Internet Services, LLC, Charlotte, NC (US)

(72) Inventors: Michael Quigley, Charlotte, NC (US); Ramon Alarcon, Los Gatos, CA (US)

(73) Assignee: INTERNET SERVICES, LLC, Charlotte, NC (US)

( * ) Notice: Subject to any disclaimer, the term of this patent is extended or adjusted under 35 U.S.C. 154(b) by 305 days.

(21) Appl. No.: 13/633,016

(22) Filed: Oct. 1, 2012

(65) Prior Publication Data

US 2013/0038792 A1 Feb. 14, 2013

Related U.S. Application Data

(63) Continuation-in-part of application No. 12/602,386, filed as application No. PCT/US2009/060262 on Oct. 9, 2009, now Pat. No. 8,378,794.

(60) Provisional application No. 61/104,658, filed on Oct. 10, 2008.

(51) Int. Cl.
*H04N 5/04* (2006.01)
*G06F 3/01* (2006.01)
(Continued)

(52) U.S. Cl.
CPC ............... *G06F 3/016* (2013.01); *A61H 19/00* (2013.01); *A61H 19/32* (2013.01); *A61H 19/44* (2013.01); *G06F 3/011* (2013.01); *G06F 3/0346* (2013.01); *G11B 27/10* (2013.01); *A61H 2201/0173* (2013.01); *A61H 2201/0176* (2013.01);
(Continued)

(58) Field of Classification Search
None
See application file for complete search history.

(56) References Cited

U.S. PATENT DOCUMENTS

| 8,095,646 B2 * | 1/2012 | Capio | H04N 7/163 709/203 |
|---|---|---|---|
| 8,255,299 B2 | 8/2012 | Cambridge | |

(Continued)

FOREIGN PATENT DOCUMENTS

| EP | 01313050 | 1/1985 |
|---|---|---|
| FR | 2899461 | 10/2007 |
| WO | WO-2010/042884 | 4/2010 |

OTHER PUBLICATIONS

Shahabi et al. "AIMS: An Immersidata Management System" CIDR 2003, pp. 1-8.*

(Continued)

*Primary Examiner* — Ranodhi Serrao
*Assistant Examiner* — James Fiorillo
(74) *Attorney, Agent, or Firm* — Foley & Lardner LLP

(57) ABSTRACT

Embodiments of the present invention relate to computer systems for transmitting or receiving and playing a plurality of data streams, where at least one of the data streams includes video data packets and/or audio data packets and at least one other data stream includes further data packets that are synchronized with the video and/or audio data packets. In particular embodiments, the further data stream includes haptic data packets that include haptic command data generated in real time with the video and/or audio data streams, where the haptic command data is provided to a haptic output device configured to replicate or approximate sensations through the output of one or more mechanical forces in synchronization with the playing of video and/or audio from the video and/or audio data streams.

22 Claims, 7 Drawing Sheets

(51) Int. Cl.
*A61H 19/00* (2006.01)
*G06F 3/0346* (2013.01)
*G11B 27/10* (2006.01)

(52) U.S. Cl.
CPC ... *A61H2201/0207* (2013.01); *A61H 2201/105* (2013.01); *A61H 2201/1215* (2013.01); *A61H 2201/501* (2013.01); *A61H 2201/5005* (2013.01); *A61H 2201/5012* (2013.01); *A61H 2201/5015* (2013.01); *A61H 2201/5043* (2013.01); *A61H 2201/5048* (2013.01); *A61H 2201/5058* (2013.01); *A61H 2201/5061* (2013.01); *A61H 2201/5071* (2013.01); *A61H 2201/5082* (2013.01); *A61H 2201/5084* (2013.01); *A61H 2230/065* (2013.01); *A61H 2230/305* (2013.01); *A61H 2230/505* (2013.01)

(56) References Cited

U.S. PATENT DOCUMENTS

| | | | | |
|---|---|---|---|---|
| 8,294,557 | B1* | 10/2012 | El Saddik | G06F 3/016 340/407.1 |
| 2003/0036678 | A1 | 2/2003 | Abbassi | |
| 2003/0161302 | A1* | 8/2003 | Zimmermann | H04L 12/5693 370/363 |
| 2004/0082831 | A1 | 4/2004 | Kobashikawa et al. | |
| 2004/0170383 | A1 | 9/2004 | Mazur | |
| 2004/0215810 | A1* | 10/2004 | Tan | H04L 29/06027 709/232 |
| 2007/0162952 | A1 | 7/2007 | Steinborn et al. | |
| 2007/0236449 | A1* | 10/2007 | Lacroix | G06F 3/016 345/156 |
| 2008/0223627 | A1 | 9/2008 | Lacroix et al. | |
| 2009/0096632 | A1* | 4/2009 | Ullrich | H04N 9/8205 340/4.21 |
| 2009/0128306 | A1* | 5/2009 | Luden | G06F 3/016 340/407.1 |
| 2009/0183199 | A1* | 7/2009 | Stafford | H04H 60/375 725/34 |
| 2010/0023638 | A1* | 1/2010 | Bowman | H04L 69/28 709/231 |
| 2010/0066512 | A1* | 3/2010 | Rank | G06F 3/016 340/407.2 |
| 2012/0044365 | A1* | 2/2012 | Shuster | G02B 27/017 348/207.1 |
| 2012/0092146 | A1* | 4/2012 | Ryu | G06F 3/016 340/407.1 |
| 2012/0272149 | A1* | 10/2012 | Lee | H04L 65/4084 715/716 |
| 2013/0198276 | A1* | 8/2013 | Leppanen | H04W 4/206 709/204 |
| 2013/0198625 | A1* | 8/2013 | Anderson | G06F 3/016 715/701 |

OTHER PUBLICATIONS

King, H Hawkeye et al. "Establishing Multimodel Telepresence Sessions Using the Session Initiation Protocol (SIP) and Advanced Haptic Codecs." Haptics Symposium, 2010 IEEE (pp. 321-325).*
MacLean et al. "Architecture for Haptic Control of Media", ASME Dyn Syst Control Div (Nov. 14-19, 1999, Nashville TN) (pp. 219-228).*
Chinese Office Action with English translation from related Chinese Patent Application No. 200980147636.6, issued Apr. 3, 2013, 10 pages.
International Search Report and Written Opinion dated Jan. 21, 2014, from related international application No. PCT/US2013/062049.
Supplementary Extended European Search Report and Opinion from related EP Patent Application No. 09219997, mailed Dec. 6, 2012, 9 pages.
Australian First Examiner's Report from related AU Patent Application No. 2009303298, dated May 23, 2012, 2 pages.
US Notice of Allowance for parent U.S. Appl. No. 12/894,284 mailed Oct. 18, 2012, 7 pages.
International Preliminary Report on Patentability dated Apr. 16, 2015, from related PCT application No. PCT/US2013/062049.
U..S Notice of Allowance dated Oct. 18, 2012, from related U.S. Appl. No. 12/602,386.
Extended European Search Report dated Apr. 28, 2016, from related EP application No. 13844184.5.

* cited by examiner

SYSTEM AND METHOD FOR SYNCHRONIZATION OF HAPTIC DATA AND MEDIA DATA

This application is a continuation-in-part of co-pending U.S. patent application Ser. No. 12/602,386 (U.S. Publication No. 2011/0133910), filed on Nov. 30, 2009, which is the National Stage of International Application No. PCT/US09/60262, filed Oct. 9, 2009, which claims benefit under 35 U.S.C. 119(e) of U.S. Provisional Patent Application No. 61/104,658, filed Oct. 10, 2008, and each of the above mentioned applications are incorporated by reference in their entirety.

BACKGROUND

Aspects of this disclosure relate to computer systems for transmitting or receiving and playing a plurality of data streams, where at least one of the data streams includes video data packets and/or audio data packets and at least one other data stream includes further data packets that are synchronized with the video and/or audio data packets. In particular embodiments, there is an audio data stream, a video data stream, and a further data stream. In particular embodiments the further data stream includes haptic data packets that include haptic command data generated in real time with the video and/or audio data streams, where the haptic command data is provided to a haptic output device configured to replicate or approximate sensations through the output of one or more mechanical forces in synchronization with the playing of video and/or audio from the video and/or audio data streams.

SUMMARY

Aspects described in greater detail below are directed to a method that includes receiving at least one of a real time, live audio data stream, and a real time, live video data stream and an additional real time, live data stream, each data stream having data packets that are time stamped from a source computer system. The method includes determining a timestamp within a data packet from the additional data stream. The method also includes generating output that is time aligned with data in the at least one of the audio data stream and video data stream based on the timestamp within the data packets of the additional data stream. In alternative embodiments, all data streams, including audio, video, or haptic data are time aligned at the receiving computer system.

An alternative method includes transmitting data by generating at least one of an audio data stream, and a video data stream from data received from at least one device. The method includes generating an additional data stream from data received from an input sensor and timestamping the packets in the at least one of the audio data stream, and the video data stream with the time when the data was received from at least one device. Additionally or alternatively, the packets may be time stamped in the additional data stream with the time when the data was received from at least one device. The method includes transmitting the at least one of the audio or video data stream and the additional data stream over a network to be output at a receiver computer system in a time aligned manner.

Aspects described in greater detail below are directed to an apparatus that includes a computer system that is configured to receive a plurality of time stamped data streams having data packets, each data stream having data packets that are time stamped from a source computer system. The computer system may include a buffer configured to determine a time stamp within a data packet from the additional data stream and a plurality of output devices generating time aligned output with data based on the timestamp within the data packets of the additional data stream, audio data stream and the video data stream.

DETAILED DESCRIPTION

Aspects of this disclosure relate to computer systems for recording and/or transmitting a plurality of data streams and receiving and/or playing a plurality of data streams recorded, transmitted, synchronized and played back all in real time. Particular embodiments relate to such systems for transmitting or receiving at least one data stream that includes video data packets and/or at least one audio data stream that includes audio data packets, and at least one additional data stream that includes further data packets that are synchronized with the video and/or audio data packets. In particular embodiments, the additional data stream(s) include data packets containing haptic data commands. After or while receiving packets from those data streams, the receiving computer may employ a buffer to time align the data streams such that the audio, video and haptic data is experienced on the receiving computer side, in the same synchronization and order in which that data was input on the transmitting computer side. While particular embodiments employ audio, video and haptic data streams, other embodiments may employ audio and haptic data streams (i.e., without video data streams) or video and haptic data streams (i.e., without audio data streams). Yet further embodiments may use other types of data streams as an alternative to or in addition to haptic data streams.

Various embodiments, allow the user at the receiving computer to experience the sights, sounds, and physical sensations that are occurring at the source computer system in real-time. In order to provide this real-time user experience, the source computer system includes a plurality of input devices (e.g. microphone, camera, temperature sensors, liquid sensors, haptic sensors). Each input device may create one or more data streams to be transmitted to the receiver computer system. Accordingly, with multiple input devices multiple data streams are transmitted to the receiver computer system. In order for the user at the receiving computer side to accurately experience the events simultaneously as they are transmitted by the source computer system at a different location, the user must receive the output in a time synchronized manner. Accordingly, the multiple data streams include a time stamp that may be used to reorder the data in the further data stream such that the output for the output device occurs in the exact same order that the input devices received the input. Example embodiments are described here as employing sensation output devices as further data output devices. Sensation output devices are further disclosed in U.S. Patent Publication No. 2011/0133910 entitled, "System and Method For Transmitting Haptic Data in Conjunction with Media Data." Accordingly, the output devices 152a, 152b, and 152 may be sensation or tactile data output devices. Other output devices such as speakers and video display screens may also be used.

Network Systems

Figure 1:
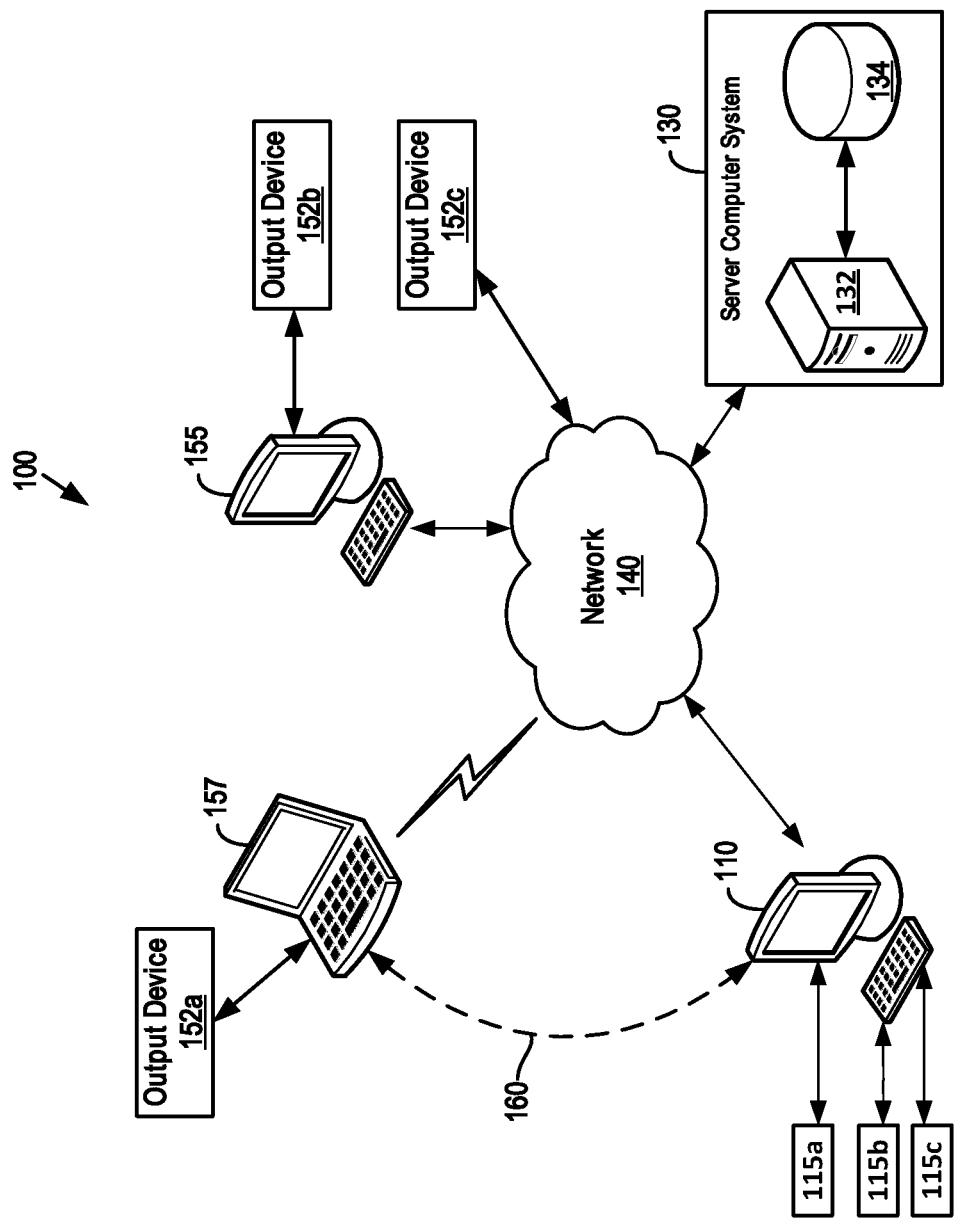
FIG. 1 illustrates an exemplary networked computing system, including output devices.

FIG. 1 shows an exemplary networked computing system, including speaker, display screen and output devices 152a, 152b, and 152c. In an example embodiment, the output devices are haptic output devices that provide a physical sensation to the skin of the user. The network system 100 includes a host computing system 155 that can be coupled to a network 140 through a wired or wireless connection. The host computing system 155 can be any computing platform, including a laptop, desktop, palm top, server, work station, tablet or other such computer. The host computing system 155 can include a processing unit, one or more output devices, such as displays and/or speakers, and one or more input devices, for two way communications, such as microphone 115a, camera 115b and sensation input device 115c. The host computing system 155 is configured with software, hardware, firmware or combinations therefore, for performing operations discussed herein.

The host computing system 155 also can be configured to execute one or more live applications for outputting media data, such as audio, video, or audio/video, to a display and/or speakers as the media is being generated at the source computing system 110. Further, the host computing system 155 can output signals representing haptic data, such as haptic (or touch sensation) commands, to an output device 152b. The haptic data signals can be time aligned with the media data, such that the output device 152b outputs a particular sensation in conjunction with the presentation of a corresponding media event. The time alignment of the media data and the haptic data may include transferring multiple (two, three or more) different streams of data. In some implementations, a single playback application, e.g. Windows Media Player®, produced by the Microsoft Corporation, Quick Time® produced by Apple, Inc. can be configured to output media data and haptic data. In some other implementations, a media application can be configured to output media data and a separate haptic application can be configured to output corresponding haptic data to a haptic device. The media application and the haptic application can be synchronized such that corresponding media and haptic events are presented substantially simultaneously, as they were produced at the source computer system 155. In various embodiments, substantially simultaneous includes the media application and the haptic application receiving the media data and the haptic data in real time as the events occur at the source computer 155. In various embodiments, substantially simultaneous includes a live streaming instead of being a prerecorded stream of data. In various embodiments, the life streaming includes outputting a live media and haptic data stream in a synchronized manner.

The output device 152b (or host device) can be coupled to the host computing system 155 through a wired or wireless interface. For example, the interface can be configured as a USB, FireWire, Wi-Fi, Bluetooth, or other such interface. In some implementations, power can be supplied to the output device 152b from the host computing system 155. In other embodiments, the output device 152b may be battery operated or be plugged into a wall outlet for power. In other embodiments, the output device 152b may communicate with the host computer system 155 wirelessly. Wireless communications includes using cellular (CDMA, 3G, LTE, etc.), Wi-Fi, Bluetooth, near field communications, etc. The output device 152b can receive signals from the host computing system 155, including signals representing haptic data (also referred to as sensation or touch data). Additionally, the output device 152b can generate one or more output sensations based on the haptic data, which can be presented to a user as one or more physical stimuli. In some implementations, the haptic data can be represented as one or more waveforms that define characteristics of a force, including a period, an amplitude, an attack, and a decay. Further, the haptic data can specify one or more actuators that generate forces, or other output sensations, such as but not limited to, heat or fluid being released by the output device, and the represented by the haptic data.

In some implementations, the output device 152a can communicate bi-directionally with the host computing system 155. For example, input received by one or more sensors and/or user controls associated with the output device 152a can be transmitted as output device data over the interface between the output device 155 and the host computing system 152b during live real-time communication with the source computer system 110. Output device data received by the host computing system 155 can be stored and/or forwarded to one or more other computing systems over the network 140, such as a server or a source computing system 110 as live real-time communication. In other embodiments, the output devices 152a, 152b, and 152c may include input sensors that generate haptic signals that are sent back in real-time to the input device 115c for two way haptic, audio and/or video live real-time communication. The one or more sensors associated with the output device 152b can be configured to collect biometric data, such as blood pressure, heart rate, and temperature. Further, the one or more sensors also can be configured to collect user actions, such as gripping, touching, or manipulating the output device. Additionally, the one or more user controls can be configured to receive user input and commands, such as actions to be performed or parameter setting adjustments.

The output device 152b can be configured to provide an identifier that can be used for identification, authorization, and verification functions. In some implementations, circuitry included in the output device 152b can be programmed with a unique identifier. Further, the identifier can be static, such as a serial number, or variable, such as a code generated based on an algorithm. In other embodiments, the identifier may be writable or rewritable to a flash memory. Additionally, operation of the output device 152b can be restricted or disabled based on the identifier. For example, a playback application executing on the host computing system 155 can be configured to request the identifier before outputting haptic data signals to the output device 152b. If the identifier cannot be validated or has been restricted, e.g. for non-payment, the host computing system 155 can prevent the presentation of haptic data signals to the output devices 152a, 152b and 152c. In some implementations, the playback application, the host computing system 155, or the output device 152b also can be configured to communicate the identifier to a server, such as during an authentication operation. In other embodiments, if the identifier cannot be validated or has been restricted, the computing system can prevent the presentation of haptic, audio and/or video signals. In other embodiments, an individual may authorize another user to receive and/or transmit haptic data to or from the individual's device and in one implementation only a single individual's output or input device can interact with the user's input or output device. In other embodiments, a user can restrict another user from accessing other devices based on an agreement or understanding with the user. For example, a couple in a long distance relationship may allow only the other person in the couple to access their input and/or output device data streams.

The network 140 can be a public network, such as the Internet, a private network, such as a local area network (LAN), or a combination thereof. Further, the network 140 can include any combination of wired and wireless links. In some implementations, the network 140 can be configured to transmit data using a plurality of protocols. Additionally, the network 140, or a portion thereof, can be configured to support the transmission of audio, video, and/or haptic data recorded and transmitted in real-time between the source computing system 110 and the host computing system 155.

A source computing system 110 also can be coupled to the network 140 through a wired or wireless connection. As with the host computing system 155, the source computing system 110 can be any computing platform, including a laptop, desktop, palm top, server, work station, tablet, mobile phone or other such computer. A sensation input device 115c (or source device) can be coupled to the source computing system 110 through a wired or wireless interface. For example, the interface can configure as a USB, FireWire, Wi-Fi, Bluetooth, or other such interface. In some implementations, power can be supplied to the sensation input device 115c from the source computing system 110. In other embodiments, the input device 115c may be battery operated or be plugged into a wall outlet for power. In other embodiments, the output device 115c may communicate with the source computer system 110 wirelessly.

The source computing system 110 can also be configured to execute one or more sensation capture applications for generating signals and/or commands representing haptic data based on signals received from the sensation input device 115c. For example, sensor data received from the sensation input device 115c can be automatically converted into one or more items of haptic data, e.g. by a sensation capture application. Further, a sensation capture application can be configured to encode haptic data signals into a media stream or file based on sensor signals received from a sensation input device 115c. Additionally, a sensor capture application can transmit haptic data signals and/or content including haptic data signals to a remote computing system, such as a server or a host computing system. The one or more sensors associated with the input device 115c can be configured to collect biometric data, such as blood pressure, heart rate, and temperature. Further, the one or more sensors also can be configured to collect user actions, such as gripping, touching, or manipulating the output device. Additionally, the one or more user controls can be configured to receive user input and commands, such as actions to be performed or parameter setting adjustments.

The sensation input device 115c can include one or more sensors configured to generate sensor signals representative of physical manipulation, including without limitation touch, gripping, movement, velocity, orientation, and stroking. For instance, the sensation input device 115c can be adapted to be inserted into and extracted from a human user, e.g. orally, vaginally, and/or anally. Sensor signals can be generated during the insertion/extraction. In some implementations, the sensation input device 115c can also include one or more sensors configured to generate sensor signals representative of environmental conditions, including without limitation location, temperature and pressure (positive and negative). The sensor signals can be transmitted from the sensation input device 115c to the source computing system 110. Sensor signals that are generated by the source computing system 110 are transmitted as they are received from the input devices. In some embodiments, the data buffers at the host computing system 155 may receive the data representing the sensor signals that are transmitted from the source computing system 110 without being stored between the source and the host computing system. The data buffers receive the data and time align the data to be output to the output device 152b and/or other output devices. Other signals, such as audio and/or video signals, also can be captured by the source computing system 110 along with the sensor signals received from the sensation input device 115c. For example, one or more cameras and/or microphones can be coupled to the source computing system 110. The sensor signals can be associated with the contemporaneously received audio/video signals, such that all of the associated signals can be presented simultaneously or substantially simultaneously during playback in real-time or near real-time on the receiving host computer side 155.

In some implementations, the sensation input device 115c can communicate bi-directionally with the source computing system 110. For example, the sensation input device 115c can receive signals representing haptic data from the source computing system 110. Additionally, the sensation input device 115c can be configured to generate one or more output sensations based on the received haptic data, which can be presented to the sensation input device 115c operator as one or more physical stimuli.

The sensation input device 115c also can be configured to provide an identifier that can be used for identification, authorization, and verification functions. In some implementations, circuitry included in the sensation input device 115c can be programmed with a unique identifier. Further, the identifier can be static, such as a serial number, or variable, such as a code generated based on an algorithm. In other embodiments, the identifier in the sensation input device 115c may be writable or rewritable to a flash memory or other types of memory. In other embodiments, if the identifier cannot be validated or has been restricted, the computing system can prevent the presentation of haptic, audio and/or video signals. In other embodiments, an individual may authorize another user to receive and/or transmit haptic data to or from the individual's device and only a single individual's output or input device can interact with the user's input or output device. In other embodiments, a user can restrict another user from accessing other devices based on an agreement or understanding with the user being restricted access. For example, a couple in a long distance relationship may allow only the other person in the couple to access their input or output device data streams.

A server computer system 130 also can be coupled to the network 140 through a wired or wireless connection. The server computer system 130 can be any suitable computing architecture, including single processor and multi-processor architectures. The server computer system 130 can be configured to provide content, including applications and data, to one or more client systems, such as the host computing system 155 or host computing system 157. Further, the server computer system 130 can be configured to receive live content, including sensor signals and other data, from one or more provider systems, such as the source computing system 110 and transmit live content to the host computer systems. Additionally, the server computer system 130 can be configured to facilitate connections between a plurality of computing systems communicating on the network 140, such as the host computing system 155 and the source computing system 110. For example, the server computer system 130 can present a directory of services and can facilitate access to those services, including performing authentication and payment collection. In other embodiments, the host computing system 155 and the source computing system 110 may communicate via the network using a peer to peer live communication link.

One or more other output devices also can be coupled to the network 140. For example, a second output device 152a can be coupled to a second host computing system 157. The second host computing system 157 and second output device 152a can receive, at substantially the same time, content similar to that being provided to the host computing system 155 and output device 152b, such as in a broadcast model. In some embodiments, the broadcast model includes the source computer system 110 transmitting to multiple different host computing systems 155, 157 and so on (multicasting). Alternatively, the second host computing system 157 and second output device 152a can independently receive content from a server or a source computing system, such as in a unicast model. In a unicast model, a single computer is receiving data from a source computer. In each implementation, the content can include any combination of audio, video, and haptic data.

In other embodiments, the source computer system 110 receives haptic sensor data from the sensation input device 115c may create a peer to peer connection 160 with a host computer, such as, the second host computer 157 utilizing a communications protocol such as RTP. In other embodiments, a different protocol that facilitates real-time live communication between two computer systems may be utilized as well. The peer to peer connection 160 may transmit audio, video and haptic command data to the second host computer 157. In various embodiments, the audio data may be received from a microphone 115a and the video data may be received from a camera 115b. In various embodiments, the audio data is streamed in an audio channel, the video data is streamed in a video channel and the haptic command data is streamed in a haptic channel. In other embodiments, the data once received from the microphone 115a, camera 115b and sensation input device 115c is placed in a different buffers and not combined. Next each data stream is packetized and sent via an audio data stream, video data stream and haptic command data stream and each data stream is time aligned at the host computer system.

Output Devices

An example output device is described below, however it is not intended to be the only output device, other output devices that provide haptic output may also be used with computing systems. Other haptic output devices may include, for example, providing haptic feedback to holographic projections or avatars, vibration device, clothing with electrodes that generate a tactile sensations. The example output devices 152a, 152b, and 152c can be defined by an outer casing, which can be formed of a rigid material, e.g. plastic. The outer casing can include contours at one or more locations to assist with handling. Further, the outer casing can include texture and/or surface features, e.g. textured region, in one or more locations to facilitate gripping. The output devices 152a, 152b, and 152c also can be constructed of multiple, separable parts. For example, the outer casing can include one or more seams along which the outer casing can be separated. Thus, at least a portion of the interior of the output device can be accessed by separating the outer causing. In some implementations, the outer casing can includeing mating structures at the one or more seams to securely join the parts of the outer casing.

An orifice adapted to receive male genitalia also can be included in the outer casing to provide access to an interior portion of the output device. The orifice can include a variable circumference that can be mechanically adjusted, e.g. by extending or retracting fingers (or extensions) positioned at the periphery of the orifice. The orifice also can include a compliant barrier, e.g. constructed of latex or other suitable materials, adapted to cover the mechanical components and to interface with the male genitalia. In some implementations, the compliant barrier can be molded to include an aperture simulating an anatomical feature, such as a vagina.

Further, the output device 152a, 152b, and 152c can include a power supply and communications interface. In some implementations, power and communications can be provided through a shared cable. In other implementations, separate power and communications cables can be coupled to the power supply and communications interface. The output device can be configured to use a variety of external power sources, including alternating current (AC) and direct current (DC) sources. Further, the output device can be configured to receive power from a computer interface, such as Bluetooth, 802.11 wireless transmission, Universal Serial Bus (USB) or FireWire (IEEE 1394) interface. Alternatively or additionally, the output device can be configured to include a rechargeable or disposable power supply, including one or more batteries.

Bi-directional communications also can be transmitted over the communication interface for real-time live communication between the output and the input devices. Control data, including haptic data, can be transmitted to the output device from a corresponding computing system or from the network 140 directly. The control data can be supplied as input to control circuitry configured to control the operation of the output device. Further, manual commands received from one or more included controls, configuration data, and sensor data, including biometric data, can be transmitted from the output device to a corresponding computing system, such as the host computing system 155. The manual commands, configuration data, and sensor data can be formatted for transmission by the included control circuitry. In some implementations, the communications interface can be implemented as a wireless interface, e.g. using radio-frequency (RF) or infrared (IR) communications.

Additionally, the output device can include one or more controls adapted to receive input from a user. For instance, a control button can be provided on the surface of the outer casing. The control button can be a single purpose control, such as a power switch. Alternatively, the control button can be a multi-purpose control, such as an intensity control that can receive input to increase or decrease the intensity of stimulation provided by the output device. Further, the control button can be insulated against liquid to reduce the risk of electric shock. Any number of controls, including buttons, dials, scroll wheels, and switches, can be included in the output device. The included controls can be used to operate the output device in a manual mode, such as by selecting a preconfigured stimulation program or by manually selecting one or more sensations.

The control circuitry (not shown) included in the output devices 152a, 152b, and 152c can be configured to operate one or more of the included components. For example, the control circuitry can be configured to provide drive signals to one or more motors associated with the interface surfaces in response to one or more received control signals. In some implementations, motors can be independently driven forward or backward, including motors associated with the same interface surface. Further, one or more motors can be used to simultaneously drive multiple interface surfaces in the same direction or in opposing directions. The control circuitry can provide control signals, e.g. based on received commands, specifying the speed, direction, and duration for which a motor is to be operated. Further, the control circuitry can be configured to monitor the speed and/or position of a motor, such as through signals provided by a rotary encoder mounted to the motor shaft. Additionally, the control circuitry can determine the torque of a motor by monitoring the current flowing through that motor.

In some implementations, a front motor and a back motor can be associated with an interface surface and a corresponding carrier belt. In response to one or more received commands, the control circuitry can generate signals causing the front and back motors to be driven in different combinations, thereby producing different sensations. For example, one motor can be turned off as the other motor is driven to stretch and vibrate a corresponding interface surface. Alternatively, both motors can be driven in the same direction to roll the interface surface and produce a sensation of motion. The front motor and back motor also can be driven at different speeds. Further, a motor can be driven to generate a periodic force or a vector force.

A library of sensations can be defined based on the motion of an interface surface and the operation of one or more motors. The sensations or the generated signals from the sensation input device are transmitted by the input device 115c and source computer system 110 as they are being created to the output devices 152a, 152b, or 152c in real-time or live as the sensations are being generated. In various embodiments, the data that is created or sent is not stored on either the source computing system 110 or host computing system 155 and instead the data is transmitted as the data is created. A waveform can be used to define how a component, such as an interface surface, is to be actuated. The waveform can have any shape, including a sine wave, a square wave, and a saw-tooth wave. Further, multiple waveforms can be at least partially superimposed to generate a single complex sensation or a combination of sensations.

The output device can also include a microprocessor and memory configured to store a library of sensations to be experienced by a user live or via real time communication. Storing data representing sensations, such as waveforms, in the output device can reduce the bandwidth and power required for communication with a corresponding computing device, such as a host computing system. For example, each sensation in the library can be assigned a unique identifier. The computing device can then control the operation of the output device by indicating the identity of the sensations to be generated instead of transmitting data describing the sensation. In some implementations, the computing device can transmit the unique identifier for a sensation stored in the library or data describing the sensation for unique or new sensations. In various implementations, the host computing system 155 may receive a haptic data stream with the identity of the sensation that is to be generated in real-time or live as the input is being provided to the input devices.

Further, the output device can be configured to store each new sensation it receives, such that it can learn sensations and expand the stored library. Alternatively, the library of sensations can be periodically updated by the corresponding computing system.

The output device also can include one or more sensors configured to generate environmental data, such as temperature, and/or user data, such as biometric data including heart rate and blood pressure. The data generated by the sensors can be provided to the control circuitry for transmission to the corresponding computing system as live real-time data that is not stored in any one of the computer systems is only temporarily stored for transmission to another computing system or output device. In some implementations, at least a portion of the electronics in the output device, including the control circuitry, memory, and the communications interface, can be located in one or more separate housings to protect them from environmental factors, such as moisture, heat, and vibration.

Additionally, the control circuitry, including the processor, included in the output device can perform one or more safety and management functions. For example, if the output device receives no commands and/or haptic data for a predetermined period of time, the output device can automatically shut itself off. The control circuitry also can be configured to monitor the amount of current drawn by a motor to detect a jam. If the current draw exceeds a predetermined amount, one or more fuses and/or transistors can be triggered to reset. Further, the use of power in the output device can be managed to ensure that power is available for essential functions. For example, the functions performed by the output device can be classified as essential functions, such as generating sensations and communicating, and non-essential functions, such as heating and dispensing lubrication.

The control circuitry can monitor the consumption of power during operation of the output device. As long as sufficient power is available, all functions can be performed. Once the demand for power exceeds, or could exceed, a predetermined threshold, one or more non-essential functions can be suspended. For example, device heating can be terminated. After the demand for power decreases and sufficient power is once again available for all functions, non-essential functions can be resumed.

Synchronization Process and System

Figure 2:
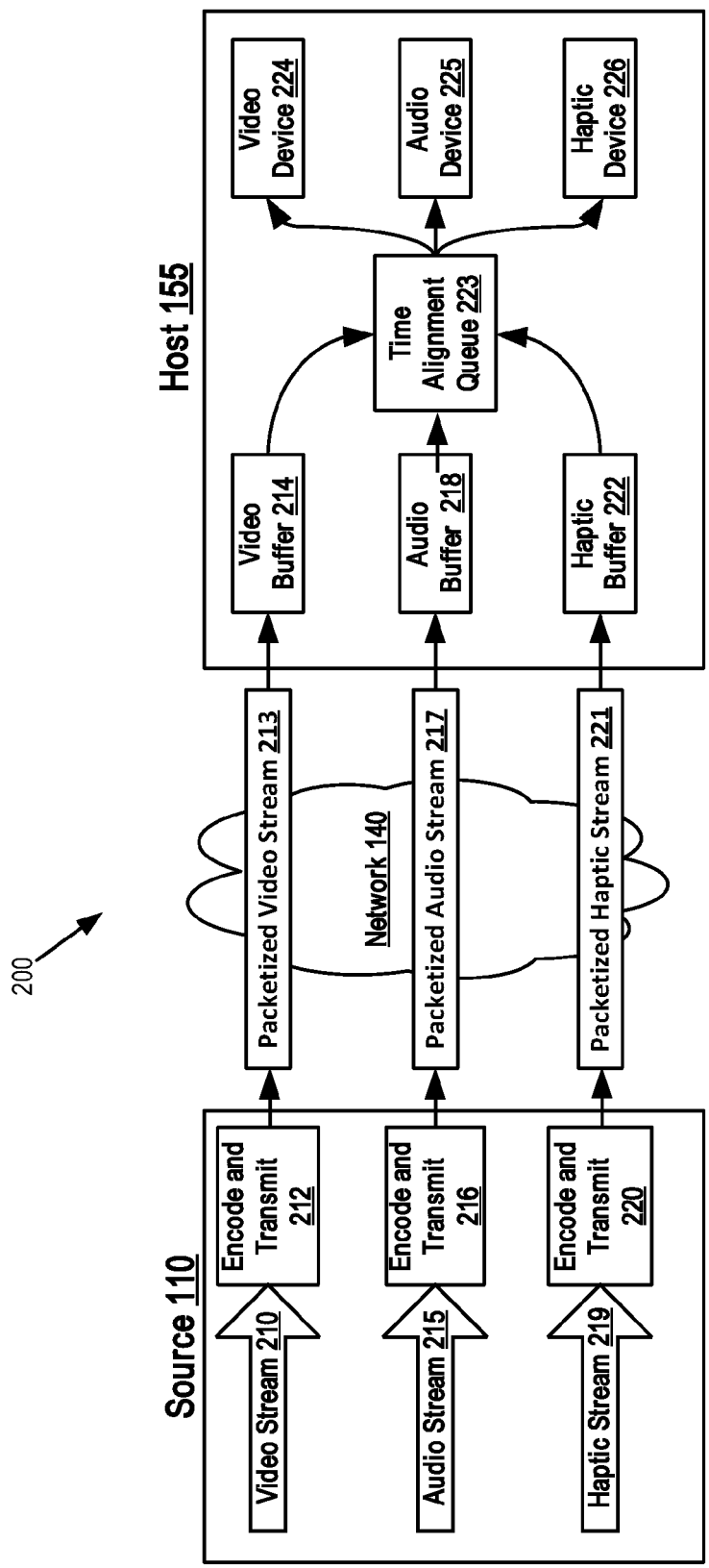
FIG. 2 illustrates an example data flow diagram that may be implemented by the networked computer system in FIG. 1.

FIG. 2 illustrates an example data flow that may be implemented by the networked computer system in FIG. 1. In various embodiments, the data flow illustrates a source computing system 110 generating at least three different data streams (e.g. audio, video and data support channel) that are each received time aligned by a host computing system 155. As shown in FIG. 2, the source computing system 110 may create multiple (e.g. two, three or more) different time stamped streams, a video stream 210, an audio stream 215 and a haptic stream 219. The video stream 210 may be generated using a camera 115b. The audio stream 215 may be generated using a microphone 115a. A haptic device 115c or 500 may generate the data in the haptic stream 219 (discussed in greater detail below). The source computer system 110 may be configured to store each stream (e.g. video stream 210, audio stream 215 and haptic stream 219) in a different buffer or a file. Next, each data stream, audio, video and haptic stream may be encoded and transmitted at steps 212, 216 and 220.

Keeping each stream in a separate buffer or file allows the source computer system 110 to packetize the streams into three different streams to be received by the host computer system 205. One advantage of having different steams is that packet loss of in one data stream does not affect the packets in the other streams. Accordingly, in some embodiments, when there is packet loss in the video data stream the haptic stream 219 and audio stream 215 may continue to be received by the host computer system 205 and the user's haptic and audio experience remains unaffected. In the case of packet loss in one data stream, the lost packets are ignored, but the other packets in the data stream are processed and provided as output to the user in a time synchronized manner as the user experiences the events in a live real-time environment.

After generating or storing the video stream 210, the audio stream 215 and the haptic stream 219, the sender may digitize, encode, time stamp and transmit each stream. Various different encoding algorithms may be used in a transmission protocol, in one embodiment using the RTP protocol for example, video stream 210 may be encoded using any one of the following encoding formats, H.261, H.263, H.264, MPEG-4, and etc. Other protocols that may be used for real-time live communication may be used to transported the encoded data streams. The audio stream 215 may be encoded using any one of the following payload formats, G.711, G. 723, G. 726, G.729, GSM, QCELP, MP3, DTMF and etc. Other formats may be used for the haptic stream 219. Other formats may also be used for the video and audio streams as may be required by any specific transmission protocol. In an example embodiment, the video data stream may be encoded using the VP8 (created by On2 Technologies and currently owned by Google, Inc.) format. In an example embodiment, the audio data stream may be encoded using the Speex (part of the GNU Project and available under the revised BSD license) or Opus format (available under a BSD license). Each packet is time stamped and sent over the network 140 in three different streams that contain the packetized video stream 213, the packetized audio stream 217 and the packetized haptic data stream 221. In an example embodiment, the packetized streams may be sent using RTP packets sent over a User Datagram Protocol (UDP). The UDP protocol was originally defined in IETF RFC 768. Other suitable transport protocols may be used for transporting the time stamped packetized data streams over the network 140.

The host computer system 205 may receive the multiple packetized data streams (e.g. audio, video and haptic) directly in a peer to peer set up or may receive multiple packetized data streams (e.g. audio or video and haptic) from a server computer system 130. The host computer system 205 may have a buffer that is configured to process each stream. As shown in FIG. 2, a video buffer 214, an audio buffer 218 and a haptic buffer 222 may be configured to receive the three packetized streams (e.g. video stream 213, audio stream 217 and haptic stream 221) of data and decode the three streams of data. Next, after decoding the data in each buffer, a time alignment queue 223 may receive the packets. The time alignment queue 223 is configured to rearrange the video stream, audio stream and haptic stream into the order in which the packets in each streams were originally created by the source computer system 110. In order to perform the time alignment function the time alignment queue 223 may determine the time at which a packet was created using the time stamp that is stored in the packets of each data stream. In other embodiments, the time alignment queue 223 may use the sequence numbers within the packets for each stream to rearrange the packets into a time aligned order. In other embodiments, time aligning includes matching the video, audio, and haptic data that was generated at the same time and sending each of those data to the video playback device 224, the audio playback device 225 and the haptic device 226. In various embodiments, the time alignment queue 223 includes delaying a fast data stream until the slowest data steam gets into the queue. One data stream may be slower than another data stream because of network delays or due to the size of the payload in each packet for the stream that is being transmitted.

In various embodiments, the time alignment queue 223 may check the timestamp of for example, the haptic data stream which may be timestamp of 2 and the audio data stream may also have a timestamp of 2. However, in this example the time alignment queue 223 may not have received the video packet with a timestamp of 2. In this example, the time alignment queue 223 may send out all packets with less than the timestamp of 2 and wait to see if a video packet with a timestamp of 2 is received in the queue. Accordingly in this example, the time alignment queue 223 may delay the processing of the audio and haptic data packets until the video packet with the same timestamp arrives in the queue. In various embodiments, the time alignment queue 223 may delay the faster streams for a predetermined period of time. After the predetermined period of time waiting for the slower stream, the packets that have been received are processed and sent to the respective output devices. In one embodiment, the predetermined period of time may be between 1 ms to 50 ms. In other embodiments, the time alignment queue 223 may send the faster packets to the devices after receiving all three of the data packets with more recent time stamps. For example, when the time alignment queue 223 has received, audio packet with timestamps 2 and 3, the video packet with time stamp 3 and the haptic data packet with timestamp 2 and 3, the time alignment queue may release the audio packet and haptic data packet with the timestamp 2 and fail to wait for the slower video data packet with a timestamp 2.

Figure 3:
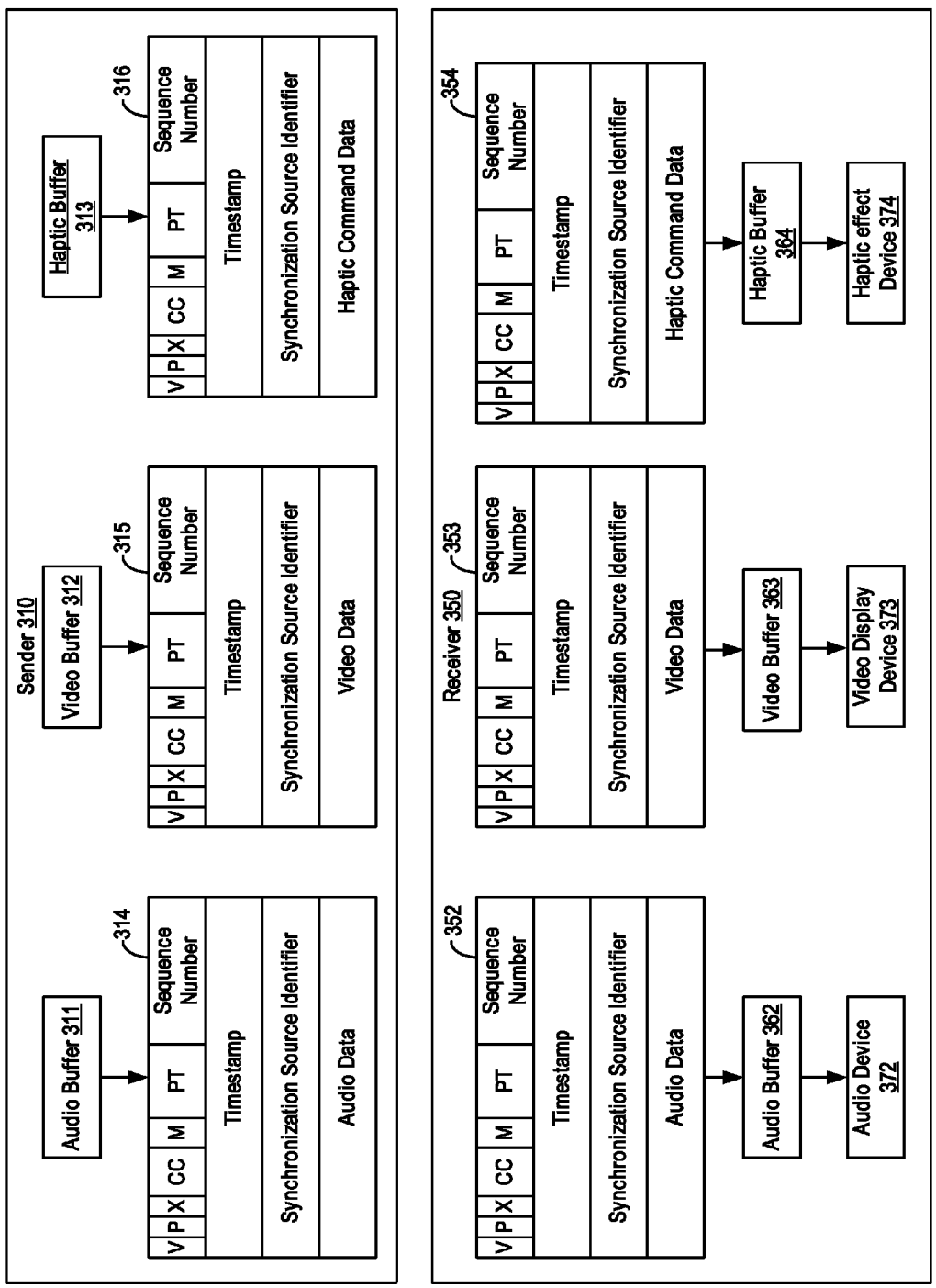
FIG. 3 illustrates the data flow between a source and a host that may be implemented by the networked computer system in FIG. 1.

FIG. 3 shows the data flow between a sender and a receiver that may be implemented by networked computer system in FIG. 1. Initially, various packets and packet streams are shown. In some embodiments, the packets may be encoded in RTP protocol as shown in FIG. 3. In particular, FIG. 3 shows various RTP packets that are being generated by the sender 310 in real-time. In some examples, a RTP header may have a size of at least 12 bytes. After the header, optional header extensions may be present. The particular class of application determines the format of the RTP payload (e.g. audio, video or Haptic command data).

The fields in the header may include a version field (V) that indicates the version of the protocol being used. In some embodiments, the version field may use 2 bits of data. The fields in the header may include a padding field (P) that may use 1 bit of data. The padding field may be used to indicate when there are extra padding bytes at the end of an RTP packet. Padding might be used to occupy a block of certain size, for example as required by an encryption algorithm. The last byte of the padding contains the number of how many padding bytes were added, including the last byte itself. The fields in the header may include an extension field (X). When set the extension field indicates the presence of an extension header between standard header and payload data. This field may be set based on the application or profile specific data. The CC field uses 4 bits of data. The 4 bits contain the number of contribution source (CSRC) identifiers that follow the fixed header. The marker field (M) uses 1 bit of information and is used at the application level or defined by a profile. If the marker field is set, it means that the current data has some special relevance for the application.

The payload type field (PT) uses 7 bits and indicates the format of the payload and determines its interpretation by the receiver. In an example embodiment, the payload type field may be specified by an RTP profile. For example, see RTP profile for audio and videoconferences with minimal control (RFC 3551). Additional payload type codes may be defined dynamically. In some embodiments, the receiver uses the RTP payload type field to distinguish between audio, video or haptic command data. In yet another embodiment, information from the network layer may be used to identify the type of data stream (e.g. audio, video or haptic) based on the source and destination information. Accordingly, the payload type may be inferred from the source and destination information in the network layer. For example, the audio stream is transmitted from a specific source and received at a specification destination. Video may be transmitted from a specific source and received at a specific destination. Similarly, the haptic data stream may be transmitted from a specific source and received at a specific destination. The pair of the specific source and destination may allow the buffer 400 or the host computer 155 to determine the type of payload being received. Accordingly, the prioritization of a stream of data over another data stream may be administered using the inferred payload type. The sequence number field in the packet uses 16 bits of data. The sequence number field is incremented by one for each RTP data packet sent and is to be used by the receiver to detect packet loss and to restore packet sequence. The protocol does not specify any action on packet loss, it is up to the application to take appropriate actions to handle packet loss. For example, the video, audio or haptic effects applications may play the last known frame in place of the missing frame. The initial value of the sequence number should be random to make known-plaintext attacks on encryption more difficult. RTP provides no guarantee of delivery, but the presence of sequence numbers makes it possible to detect missing packets. Other protocols beside RTP may be used and may use sequence numbers, timestamps or other suitable information to provide real-time live communication. The timestamp field may use 32 bits. The timestamp is used to enable the receiver to play back the received media and haptic data at appropriate intervals. The granularity of the timing is application specific. For example, an audio application that samples data once every 125 μs (8 kHz, a common sample rate in digital telephony) could use that value as its clock resolution. The clock granularity is one of the details that are specified in the RTP profile for an application. In some embodiments, the video data may be sampled at approximately 15, 10 or 5 frames per second depending on the network speed. In other embodiments, the audio data may be sampled at approximately 16 kHz. In some embodiments, the haptic data may be sampled at approximately 25 Hz or under certain implementation at 8 kHz clock frequency. For example in the packetization implementation may use an 8 kHz clock. Synchronization source identifier field identifies the source of a stream and may use 32 bits of data. In other embodiments, the host computing system 155 synchronizes the multiple data streams irrespective of sampling rates. The synchronization sources within the same RTP session may be unique.

FIG. 3 shows three different data streams that are stored in three different buffers at a sender 310. In other embodiments, the three data streams may be stored in a single buffer. In other embodiments, the audio and the video stream may be stored in a media buffer and the haptic data may be stored in a haptic buffer 313. In an example embodiment, the audio buffer 311, the video buffer 312 and the haptic buffer 313 may packetize their data using a RTP packet shown in FIG. 3, as described above. The audio data packet 314 includes each of the fields described above and the audio data. The video buffer 315 includes each of the fields described above and the video data. The haptic buffer 313 includes each of the fields described above and the haptic command data. After being packetized the audio packet 314, the video packet 315 and the haptic packet 316 are transmitted to the receiver 350. Once the packets 314, 315 and 316 are received as packets 352, 353 and 354, the appropriate buffer for each packet is identified based on the type of data within the packet. In this example, three different buffers, audio buffer 362, video buffer 363 and haptic buffer 364 may queue the packets and send data to the output devices. In other embodiments, as discussed with respect to FIG. 4, a single buffer may receive the packets and rearrange the packets to be time aligned according to timestamps. The buffers may be configured to prioritize the processing of the haptic data to be higher than any other type of data. In some embodiments, the buffers 362, 363 and 364 may communicate the timestamp information amongst each other to verify that each buffer is releasing the correct time stamped packet to the audio device 372, video display device 373, and the haptic effect device 373. In other embodiments, the buffers 362, 363 and 364 may verify the timestamps for the packets that were most recently released by the other buffers and queue the packets with the time stamped packet to release to the audio device 372, video display device 373 and haptic effect device 374.

Figure 4A:
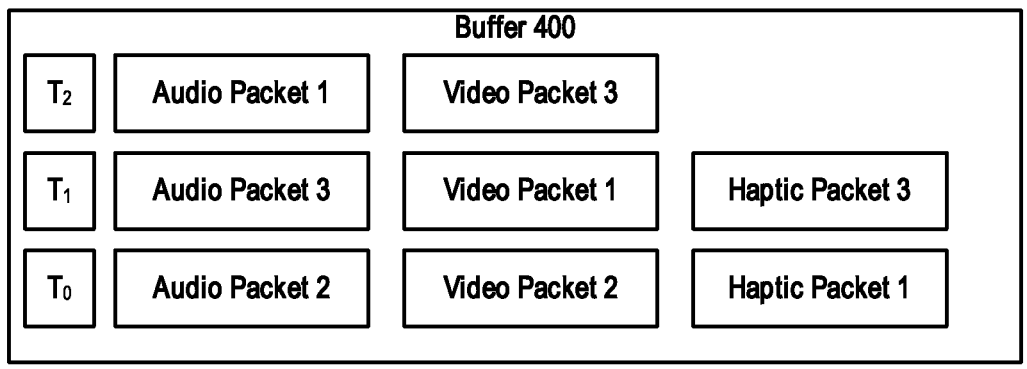
FIGS. 4A, 4B, and 4C illustrate buffer sequences that rearrange audio, video and haptic data packets according to their timestamps.

FIG. 4A displays the contents of a buffer 400 that may be stored on the receiver or host computer system 155. As shown in FIG. 4a a plurality of packets are received in three different streams. The buffer 400 receives a set of audio packets 2, 3, and 1. The buffer 400 receives a set of video packets 2, 1, and 3. The buffer 400 receives a set of haptic data packets 1 and 3. The numbers after the packets in this example are used to indicate the relative timestamps for each packet. The buffer 400 is configured to align each received packet into a similar order as they were generated. The buffer 400 is configured to arrange the received packets such that the packets are time synchronized based on when the source computer created the packets. The audio stream, video stream and haptic data stream may fail to arrive at the buffer 400 in a time aligned order. For example, the audio packet 2 has arrived before the audio packets 1 and 3. In another example, the video packet 2 has arrived at the buffer 400 before video packets 1 and 3. As shown in the buffer 400 the haptic packet 1 has arrived before the haptic packet 3. However, the haptic packet corresponding to the audio packet 2 and video packet 2 has not arrived at the buffer 400 in FIG. 4A.

Figure 4B:
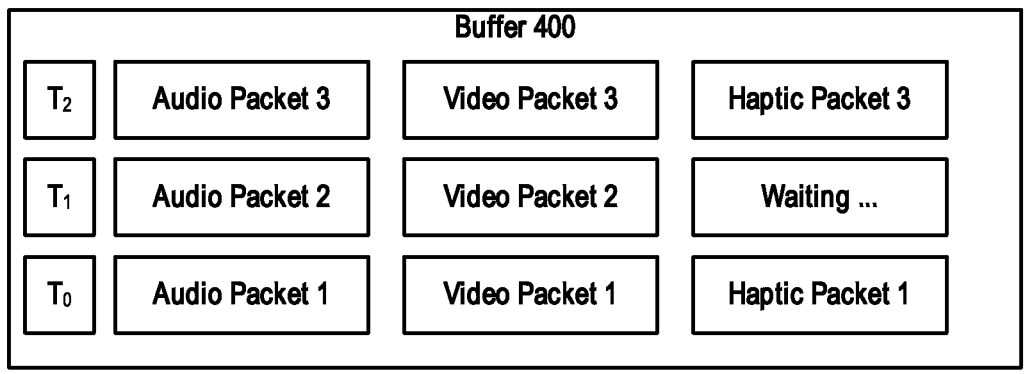

In FIG. 4B the buffer 400 rearranges the packets that have been received according to their timestamps. For example, the audio packets 1, 2, and 3 are arranged to be time aligned with time $T_0$, $T_1$, and $T_3$, respectively. The video packets 1, 2, and 3 are rearranged to be time aligned with time $T_0$, $T_1$, and $T_3$, respectively. Also the haptic packets 1 and 3 have been received and remain in their original time aligned manner. Haptic packet 1 is in the time slot $T_0$ and the haptic packet 3 is in the time slot $T_3$. In other embodiments, buffer 400 in FIG. 4B also creates an empty time slot for the haptic packet 2 at time $T_1$ because the haptic packet 2 has not been received. In other embodiments, when the haptic packet 2 has not been received and all of the data for a later time slot such as time $T_2$ is already in the buffer, the buffer 400 may release the audio packet 2 and video packet 2 to the audio and video playback devices. Upon receiving the haptic packet 2 after the release of similarly time stamped data, the haptic packet 2 is deleted and/or ignored. Accordingly, in some embodiments, when packets arrive late in RTP protocol, the late packet may be deleted or ignored.

Figure 4C:
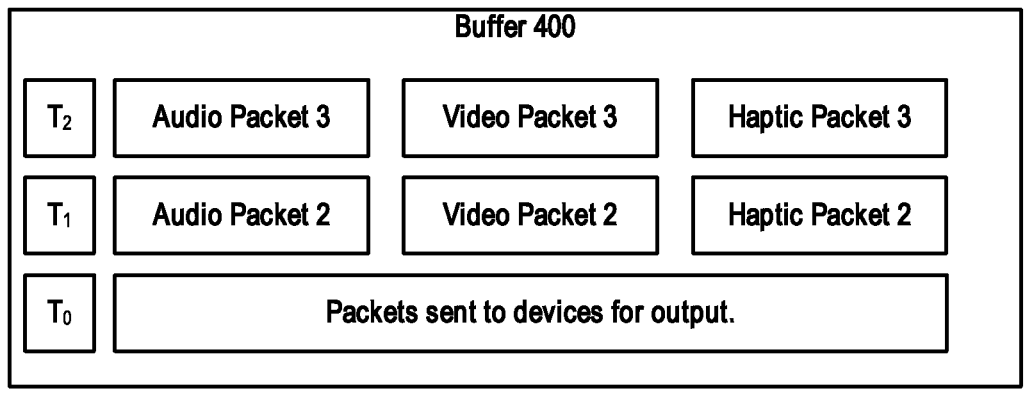

In FIG. 4C the buffer 400 displays packets for time $T_1$ and $T_2$ and indicates that the packets for time $T_0$ have been sent to the audio, video and haptic output devices. At time $T_2$ the haptic packet 2 for which the buffer 400 had been holding the audio and the video packets 2, has been received by the buffer 400 and placed into the time slot $T_2$. Next, the buffer 400 may release audio, video and haptic packets 2 to the respective devices to output to the user.

Figure 5:
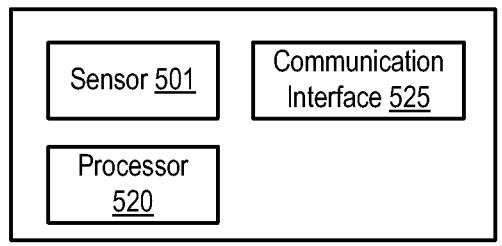
FIG. 5 illustrates an exemplary configuration of interface surfaces in a sensation input device.
Figure 8:
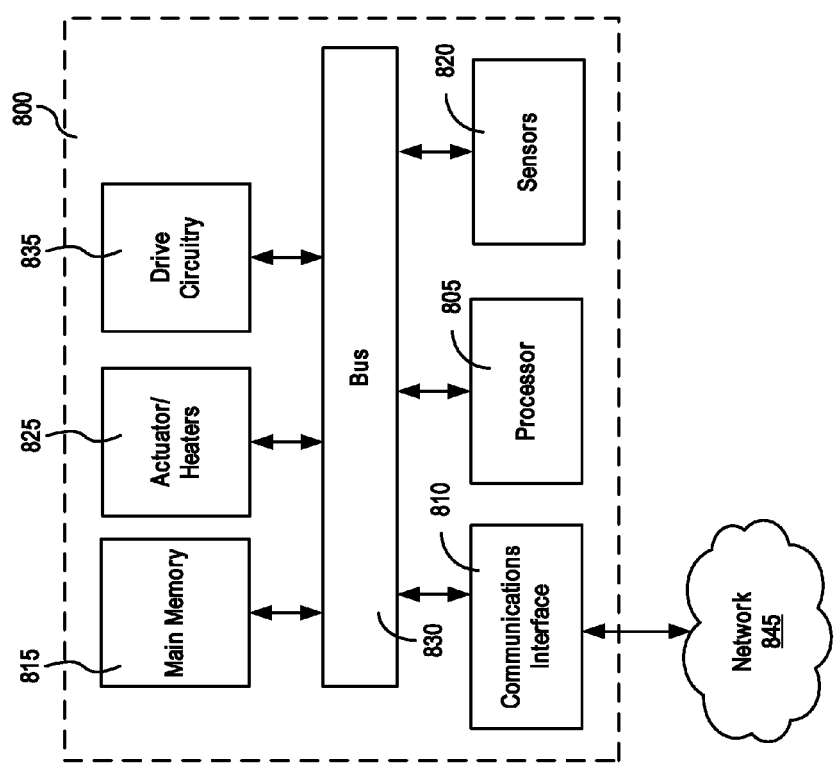
FIG. 8 presents an exemplary arrangement of control circuitry included in a output device.

FIG. 5 illustrates a block diagram of a haptic input device 500 described in greater detail in the description of FIG. 8 of U.S. Patent Publication No. 2011/0133910. In other implementations other sensors may be used to generate haptic data. In other embodiments a keyboard and mouse that are keyed to generate haptic data for a haptic output device may be used. Other input sensors may also be used. The haptic input sensor 501 can include processing circuitry and multiple sensors. The one or more sensors includes a microphone and a camera to provide the view and sounds from the sensation input device 500. The processor 520 can be coupled with a communication interface 525, which can be configured to communicate with one or more external computing devices or an associated cradle. In some implementations, the communications interface 525 can be a wired interface, such as a USB or FireWire interface. In some other implementations, the communications interface can be a wireless interface, such as an RF or an IR interface. The processor 520 included in the sensation input device 500 can provide sensor data, including without limitation light, gas pressure, tactile, and inertial data, to the communication interface 525, which can then transmit the sensor data to a computing device, such as a source computing system 155. In some implementations, the communication interface 525 can be configured to implement bidirectional communications. The sensor data communicated to the computing device or cradle can be used to determine what actions are being performed on the sensation input device 500 and how it is being manipulated. Further, one or more applications executing on the computing device can generate haptic data representing physical sensations based on the received sensor data. Also, the communication interface 525 can be configured to receive one or more signals, including commands, from the computing device or the associated cradle.

Figure 6:
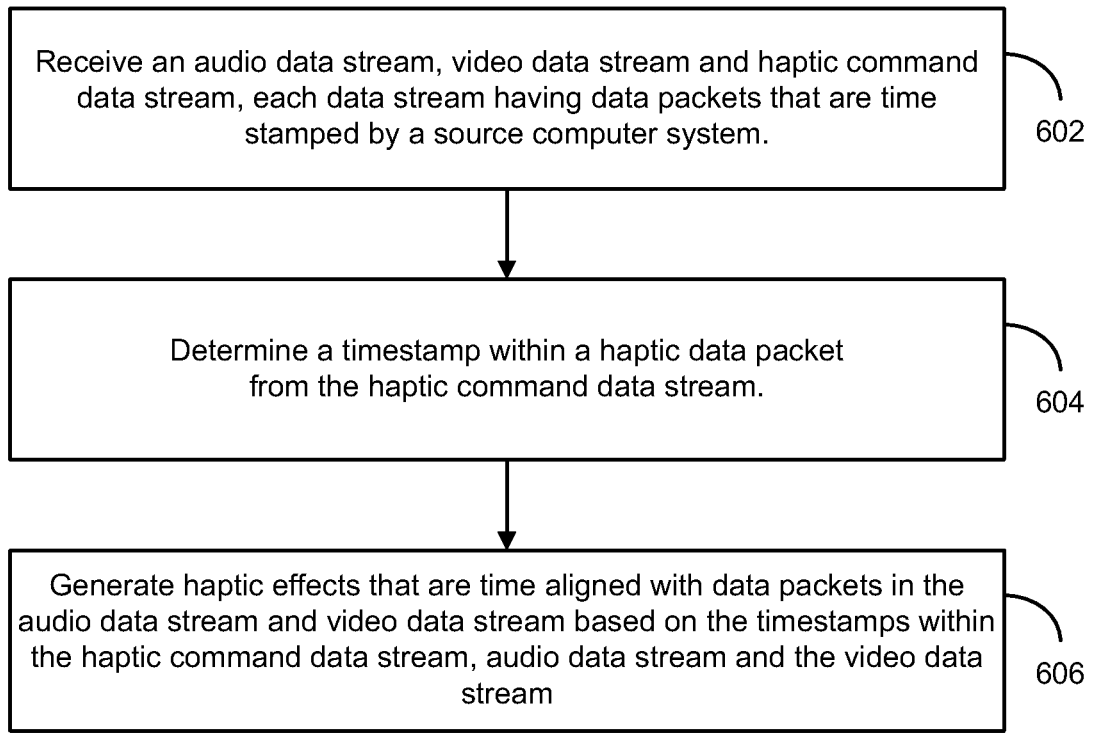
FIG. 6 illustrates a process that may be implemented by the networked computing system in FIG. 1.

FIG. 6 illustrates a process that may be implemented by the networked computing system in FIG. 1. At step 602, the host computer system may receive an audio data stream, a video data stream and a haptic command data stream, each data stream having data packets that are time stamped from a source computer system. In various embodiments, the source computer system may receive audio data from a microphone, video data from a video capture device, and haptic data from a plurality of haptic sensors. In some embodiments, the source computer may use three separate files to store the audio, video or haptic data. In other embodiment, the source computer may use three different buffers to store the audio, video or haptic data. In some embodiments, the audio, video and haptic data is stored on the source computer for a temporary period of time to allow packetization of the data to send to a host computer in separate data streams. The source computer is generating the data packets as soon as possible in order to enable real time communication with a host computer system. As the data is converted into packets to be transported using a transmission protocol such as the real time protocol (RTP), the data is time stamped according to the protocol, in this case RTP. In some embodiments, the data may be time stamped as it is received irrespective of the transport protocol that is being used. In other embodiments, other transport/application protocols besides RTP over UPD may be used for data transportation and the timestamp from when the data was received by the source computing system 110 may be used for time synchronization by the host computing system 155, during an exchange of data that occurs instantaneously or with negligible latency due to network delays. In some embodiments, the data is transmitted to a host computer using UDP. Other suitable protocols may be used for communication.

Next at step 604, the host computer system that is connected to a haptic output device may determine a timestamp within a haptic data packet from the haptic command data stream. In some embodiments, the payload type field in the packet may indicate the type of data stored within the packet. In other embodiments, the host computer system may review the received packets to determine which packets include a payload type that matches the payload type that is designated for the haptic data.

At step 606, a haptic device that is connected to the host computer may generate haptic effects that are time aligned with data in the audio data stream and video data stream based on the timestamps within the haptic command data stream, audio data stream and the video data stream. A buffer may be used on the host computer system to time align the audio, video and haptic data streams. Time aligning the data streams may include generating output on the display, audio or haptic device in the same order as the data was received by the source computer system. For example, if a sound or image was captured before a haptic input was received on the source computer, the time alignment process at step 606 generates the sound and image before the haptic effect is output on a host computer. In some embodiments, the audio, video and haptic data is received within 1 to 50 millisecond of being generated on the source computer system. The reduction in latency allows a user of the host computer system to experience the audio, video and haptic effects in real time as the user on the source computer system is generating them.

Figure 7:
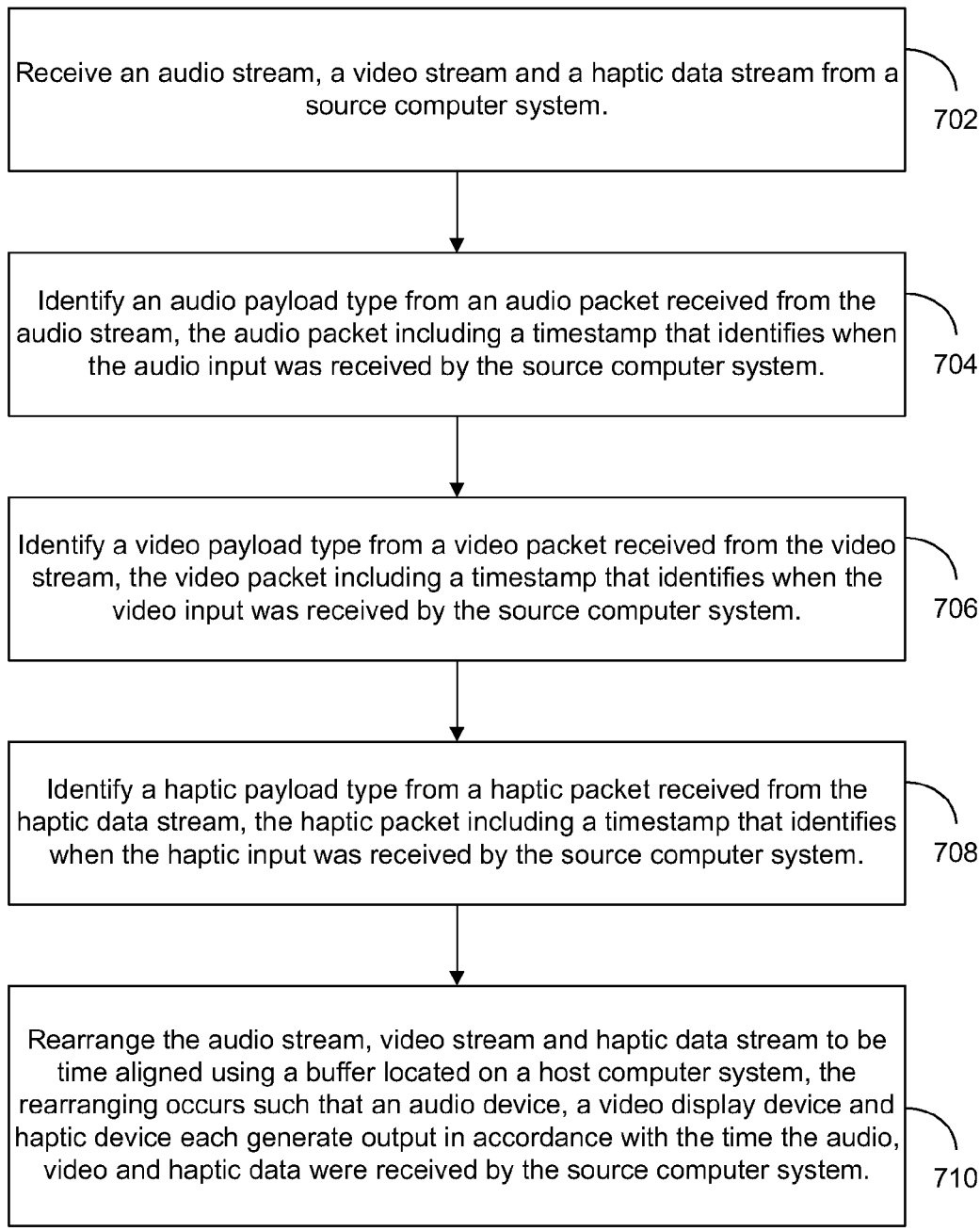
FIG. 7 illustrates a process that may be implemented by the networked computing system in FIG. 1.

FIG. 7 illustrates a process that may be implemented by the networked computing system in FIG. 1. At step 702 the host computer system 155 may receive an audio stream, a video stream and a haptic data stream from a source computer system 110. Next at step 704, the host computer system may identify an audio payload type from an audio packet received from the audio stream, the audio packet including a timestamp that identifies when the audio input was received by the source computer system 110. At step 706, the host computer system 155 identifies a video payload type from a video packet received from the video stream, the video packet including a timestamp that identifies when the video input was received by the source computer system 110. At step 708, the host computer system 155 identifies a haptic payload type from a haptic packet received from the haptic data stream. The haptic packet including a timestamp that identifies when the haptic input was received by the source computer system. At step 710, the host computer system rearranges the audio stream, video stream and haptic data stream to be time aligned using a buffer located on a host computer system, the rearranging occurs such that an audio device, a video display device and haptic device each generate output in accordance with the time the audio, video and haptic data were received by the source computer system.

Example Output Device

FIG. 8 presents an arrangement of control circuitry included in an example output device. Other configurations and other output devices may be used for haptic output. The haptic output device 800 may be one implementation of the output devices 152a, 152b, and 152c. Alternatively, the host computer 155 functionality and the output device 152b functionality may be implemented by the haptic output device 800. Alternatively, the source computer system 110 and the input devices 115a, 115b, and 115c may be implemented by device 800. The output device 800 can include a processor 805 (or microprocessor) configured to execute one or more instructions, including instructions stored in a memory 815 and instructions, e.g. haptic commands, received from an external computing system in a time synchronized manner with video and audio data. For instance, the processor 805 can receive haptic data including haptic commands from the communication interface 810. The processor 805 can generate one or more signals to components, e.g. actuators, included in the output device 800 based on the received haptic data. The processor 805 can be a general or special purpose processor, and can be implemented as a single processor or as a combination of processors with multiple cores having a shared cache storage medium. Further, the processor 805 can be configured to communicate with all of the components included in the output device 800 over a bus 830.

The communication interface 810 can be configured to communicate bi-directionally with one or more external devices, such as a cradle and a host computing device. For instance, the communication interface 810 can receive haptic data, including one or more haptic commands, from an external computing system. Further, the communication interface can be configured to transmit sensor data generated in the output device 800 to an external computing system. The communication interface 810 can include either or both of a wired communication interface, e.g. a USB or FireWire interface, or a wireless interface, e.g. an IR or RF interface.

The memory 815 included in the output device 800 can be either or both of volatile memory, e.g. RAM, and nonvolatile memory, e.g. ROM. The memory 815 can be configured to store operating instructions, including one or more force commands, for execution by the processor 805. For instance, the memory 815 can store a library of haptic force commands which can be identified by a reference code or other such shortened representation. During operation, an external computing system can communicate the reference code for a command to the output device 800 and the processor 805 can translate the reference code into one or more components corresponding to a force command. Further, the memory 815 can store one or more operating routines, which can be executed to output a series of haptic forces without the cooperation of an external computing device. Additionally, the memory 815 can be configured to store one or more items of data temporarily or permanently. For example, sensor data received from one or more sensors 820 can be temporarily stored for transmission to an external computing system. Also, the output device 800 can be updated, such as by permanently storing new haptic commands and/or revised operating instructions.

The output device 800 can include multiple sensors 820, including without limitation temperature sensors, position sensors, light sensors, pressure sensors (psi and positive/negative atmospheric), capacitive sensors, inertial sensors, power sensors, and biometric sensors for collecting data from a user, e.g. heart rate and/or blood pressure. The sensors 820 can be configured to provide sensor data to the processor 805 whenever the output device 800 is powered on. Alternatively, one or more of the sensors 820 can be placed into an idle state when the output device 800 is inactive, such as during charging.

Additionally, the output device 800 can include one or more actuators/heaters 825, which can be controlled by the processor 805, e.g. directly or through specialized drive circuitry 835. One or more of the actuators/heaters 825 can be configured to receive operating signals, e.g. on/off or various other functions. In other embodiments, the actuator/heaters 825 may receive operating signals or sequenced signals, such as but not limited to, signals that generate heat for 5 minutes, and then generate heat at 4 minute intervals. In other embodiments, the actuators/heater 825 may react based on the internal conditions of the output device, such as, heating only when the temperature drops below a threshold temperature. Other actuators/heaters 825 included in the output device 800, e.g. bi-directional motors, can be controlled by the specialized drive circuitry 835 in response to complex control signals, such as instructions specifying direction and amplitude.

Processor 805 also can be configured to execute one or more algorithms stored in the memory 815. For instance, the processor 805 can be configured to execute an idle algorithm to warm at least a portion of the output device 800, e.g. one or more interface surfaces, when the device is powered on but no haptic forces are being generated. The idle algorithm can be configured to activate one or more heating elements, at least periodically, to maintain the internal temperature of the output device within a predetermined operating range. The idle algorithm also can cause the processor to activate one or more actuators, at least periodically, to move one or more corresponding interface surfaces and thus distribute heat within the output device 800. Further, the idle algorithm can be terminated upon the occurrence of one or more predetermined events, such as receipt of a command or expiration of an idle timer.

Additionally, the processor 805 can be configured to execute one or more authentication and/or security protocols. For instance, the processor 805 can communicate identification information corresponding to the output device 800 to an authentication server, either directly or through a host computing device. If the output device 800 can be authenticated, the processor 805 can receive a response from the authentication server, e.g. including the identification information corresponding to the output device 800. Further, the processor 805 can be configured to enable the output device 800 for further operation if the response can be validated. Otherwise, the processor 805 can disable the output device 800.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions tangibly encoded on a computer-readable medium for execution by, or to control the operation of, data processing apparatus. The computer-readable medium can be a machine-readable storage device, a machine-readable storage substrate, a memory device, or a combination thereof. The term "data processing apparatus" encompasses all apparatus, devices, and machines for processing data, including by way of example a programmable processor, a computer, or multiple processors or computers. The apparatus can include, in addition to hardware, code that creates an execution environment for the computer program, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program need not correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array), a PLD (programmable logic device), or an ASIC (application-specific integrated circuit).

Processors suitable for the execution of a computer program include both general and special purpose microprocessors, and one or more processors of any kind of digital computer. Generally, a processor can receive instructions and data from either or both of a read-only memory and a random access memory. The essential elements of a computer are a processor for performing instructions and one or more memory devices for storing instructions and data. Generally, a computer also can include, or be operatively coupled to receive data from and/or transfer data to one or more mass storage devices, e.g., magnetic, magneto-optical, or optical disks.

Moreover, a computer can be embedded in another device, such as a mobile telephone, a personal digital assistant (PDA), or a mobile audio player. Computer-readable media suitable for storing computer program instructions and data include all forms of non-volatile memory, media and memory devices, including semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on or in conjunction with a computer having a display device, e.g., an LCD (liquid crystal display) or OLED (organic light emitting diode) display, for presenting information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described is this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations, but rather as descriptions of features specific to particular embodiments. Certain features that are described in this specification in the context of separate embodiments also can be implemented in combination in a single embodiment. Conversely, various features that are described in the context of a single embodiment also can be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed. In certain circumstances, multi-tasking and parallel processing may be advantageous. Moreover, the separation of various system components in the embodiments described above should not be understood as requiring such separation in all embodiments, and it should be understood that the described program components and systems generally can be integrated together in a single software product or packaged into multiple software products.

Thus, particular embodiments have been described. Other embodiments are within the scope of the following claims. For example, the actions recited in the claims can be performed in a different order and still achieve desirable results.

What is claimed is:

1. An apparatus, comprising at least one processor and at least one memory including computer program code, the at least one memory and the computer program code configured to, with the at least one processor, cause the apparatus to perform at least the following:

receive, from a source computer system, a plurality of time stamped data streams including an additional data stream and at least one of an audio data stream or a video data stream, each data stream having data packets that are time stamped, wherein the audio data stream includes audio packets that contain timestamped audio information for an audio device and the video data stream includes video packets that contain timestamped video information for a video display device, and wherein the additional data stream includes command data packets that contain timestamped command data for an additional device;

determine a time stamp of a command data packet received in the additional data stream, wherein the timestamp corresponds to a time when the command data was received by the source computer;

determine a time stamp of at least one of an audio data packet received in the audio data stream or a video packet received in the video data stream, wherein at least one of: (a) the timestamp of the audio packet corresponds to a time when the audio information was received by the source computer, or (b) the timestamp of the video packet corresponds to a time when the video information was received by the source computer;

time align the timestamped command data with at least one of the timestamped audio information or the timestamped video information in at least one buffer, according to the timestamp determined for the command data packet received in the additional data stream and the timestamp determined for the at least one of the audio packet or the video packet received in at least one of the audio data stream or the video data stream; and generate output signals for controlling a plurality of output devices to provide time aligned output according to the command data in data packets of the additional data stream, and the at least one of the audio information in the audio data stream or the video information in the video data stream that is time aligned with the command data;

wherein at least one of (a) the audio packet from the audio data stream is adapted to control an audio device, at a time based on the timestamp of the audio packet, time aligned with the timestamp of the data packet from the additional data stream, or (b) the video packet from the video data stream is adapted to control a video display device, at a time based on the timestamp of the video packet, time aligned with the timestamp of the data packet from the additional data stream.

2. The apparatus of claim 1, wherein the additional data stream is a haptic command data stream having at least one haptic command data packet with a timestamp.

3. The apparatus of claim 2, wherein at least one of the plurality of output devices comprises a haptic output device.

4. The apparatus of claim 3, wherein at least one of the output devices includes at least one of a speaker for outputting the audio data stream that is time aligned with the haptic data stream, or a video display device for outputting the video data stream that is time aligned with the haptic data stream.

5. A method, comprising:

receiving, by a host computing system, from a source computer system, an additional data stream and at least one of an audio data stream or a video data stream, each data stream having data packets that are time stamped, wherein the audio data stream includes audio packets that contain timestamped audio information for an audio device and the video data stream includes video packets that contain timestamped video information for a video display device, and wherein the additional data stream includes command data packets that contain timestamped command data for an additional device;

determining a timestamp of a command data packet received in the additional data stream, wherein the timestamp corresponds to a time when the command data was received by the source computer;

determining a timestamp of at least one of an audio data packet received in the audio data stream or a video packet received in the video data stream, wherein at least one of: (a) the timestamp of the audio packet corresponds to a time when the audio information was received by the source computer, or (b) the timestamp of the video packet corresponds to a time when the video information was received by the source computer;

time aligning, at a user computer, the timestamped command data with at least one of the timestamped audio information or the timestamped video information in at least one buffer, according to the timestamp determined for the command data packet received in the additional data stream and the timestamp determined for the at least one of the audio packet or the video packet received in at least one of the audio data stream or the video data stream; and generating output signals for controlling the additional device, according to the command data packet from the additional data stream at a time based on the timestamp of the command data packet, time aligned with at least one of the timestamped audio information or the timestamped video information;

wherein at least one of (a) the audio packet from the audio data stream is adapted to control an audio device, at a time based on the timestamp of the audio packet, time aligned with the timestamp of the data packet from the additional data stream, or (b) the video packet from the video data stream is adapted to control a video display device, at a time based on the timestamp of the video packet, time aligned with the timestamp of the data packet from the additional data stream.

6. The method of claim 5, wherein the additional data stream is a haptic command data stream having at least one haptic command data packet with a timestamp.

7. The method of claim 6, wherein:

the haptic command data stream includes haptic commands that activate an actuator that is time synchronized with the at least one of the video data stream or the audio data stream; and the haptic device is configured to maintain a haptic effect according to the timestamp determined for the data packet in the additional data stream.

8. The method of claim 7, wherein the audio, video and haptic command data streams are generated by a source computer system in real time and transmitted to at least one recipient in real time.

9. The method of claim 6, further comprising at least one buffer that is configured to receive the at least one of the audio data stream or the video data stream and to receive the haptic data stream, wherein one of the audio data stream, the video data stream and the haptic data stream is the fastest data stream received and another one of the audio data stream, the video data stream and the haptic data stream is the slowest data stream received; and wherein the buffer is configured to delay the generation of the output corresponding to the fastest data stream received until the slowest data stream received.

10. The method of claim 9, wherein the buffer is configured to determine the fastest data stream from among the audio, video and haptic command data streams by comparing the time stamps determined for data packets received in the audio, video and haptic command data stream;

wherein the buffer is configured to reorder packets within the data streams such that each data stream is queued to be released to an output device based on being time aligned with the other data streams.

11. The method of claim 6, wherein the timestamp for the haptic data packet indicates when the data packet within the haptic command data stream was created by the source computer system.

12. The method of claim 6, wherein the haptic command data stream is free of any audio or video data.

13. The method of claim 6, wherein the audio data stream, the video data stream and the haptic command data stream are received as separate streams of data.

14. The method of claim 6, wherein the haptic data stream comprises haptic data that is aligned with a corresponding media event that comprises the at least one of the audio data stream or the video data stream.

15. The method of claim 5, wherein the output is generated by an output device, and the output device and the source computer system are different systems.

16. A method for transmitting data, comprising:

generating at least one of an audio data stream or a video data stream from data received from at least one device;

generating an additional data stream from data received from an input sensor;

timestamping packets in the at least one of the audio data stream or the video data stream with a time corresponding to a time when the data was received from the at least one device;

timestamping packets in the additional data stream with a time corresponding to a time when the data was received from the at least one device; and transmitting the additional data stream including the timestamped packets in the additional data stream over a network, and transmitting the at least one of the audio data stream or the video data stream including the timestamped packets in the at least one of the audio data stream or the video data stream over the network, the timestamped packets in the transmitted data streams to be time aligned at a receiver computer system based on the timestamp of the packets of the additional data stream and the at least one of the audio data stream or the video data stream;

wherein the timestamped packets in the additional data steam and the timestamped packets in the at least one audio data steam or video data steam are provided for time aligning a fastest one of the data streams with a slowest one of the data streams.

17. The method of claim 16, wherein the additional data stream is a haptic command data stream having at least one haptic command data packet with a timestamp.

18. The method of claim 17, wherein generating at least one of the audio or video data stream and additional data stream further comprises:

receiving at least one of audio information from an audio receiving device and video information from a video capture device;

receiving haptic information from a haptic input device;

generating separate data streams for the haptic information and for the at least one of the audio information, video information and haptic information for transmission over a network.

19. The method of claim 17, wherein the audio, video and haptic data streams are generated by a source computer system in real time and transmitted to at least one recipient in real time.

20. The method of claim 17, wherein the audio, video and haptic data streams are generated by a source computer system in real time and transmitted to at least one recipient in real time.

21. The method of claim 16, wherein the transmitting the at least one of the audio or video data stream and the additional data stream over a network includes transmitting audio, video and haptic data in real-time.

22. A method comprising:

receiving, on a host computer system, a haptic data stream and at least one of an audio data stream or a video data stream from at least one source computer system, each data stream having data packets that are received with time stamps;

identifying at least one of an audio packet in the received audio data stream or a video packet in the received video data stream, the audio packet including a time stamp that identifies when audio data input for a payload of the audio packet was received by the at least one source computer system and the video packet including a time stamp that identifies when the video data input for a payload of the video packet was received by the at least one source computer system;

identifying a haptic packet in the received haptic data stream, the haptic packet including a time stamp that identifies when haptic input for a payload of the haptic packet was received by the at least one source computer system;

arranging at least one data packet from each of the haptic data stream and at least one of the audio data stream or the video data stream to be time aligned with each other using a buffer on the host computer system; and generating output data comprising data corresponding to the payload of the haptic packet, time aligned with data corresponding to the payload of at least one of the audio packet or the video packet, based on the time stamp included with the haptic packet and the time stamp included with the at least one of the video packet or the audio packet;

wherein the output date is used to control a haptic device;

wherein one of the haptic data stream and the at least one of the audio data stream or the video data stream is the fasted data stream received, and another one of the haptic data stream and at least one of the audio data steam or the video data steam is the slowest data steam received;

wherein the buffer is configured to delay the generation of the output corresponding to the data of the fastest data steam received until the slowest data steam received; and wherein the payload of at least one of the audio packet or the video packet is adapted to control at least one of an audio device or a video device.

* * * * *